United States Patent [19]

Karnopp

[11] Patent Number: 4,743,000
[45] Date of Patent: May 10, 1988

[54] METHOD AND APPARATUS FOR CONTROLLING SPRING STIFFNESS, IN PARTICULAR IN VEHICLES

[75] Inventor: Dean Karnopp, Davis, Calif.

[73] Assignee: Robert Bosch GmbH, Stuttgart, Fed. Rep. of Germany

[21] Appl. No.: 851,984

[22] Filed: Apr. 14, 1986

[30] Foreign Application Priority Data

Apr. 12, 1985 [DE] Fed. Rep. of Germany ... 8510760[U]
Jul. 12, 1985 [DE] Fed. Rep. of Germany ....... 3524863

[51] Int. Cl.⁴ .................... F16F 9/04; F16D 65/52; B60G 11/26
[52] U.S. Cl. .................... 267/218; 188/299; 188/314; 267/64.21; 280/707
[58] Field of Search ............... 188/269, 279, 313, 314, 188/318, 284, 286, 181 A, 181 C, 182; 267/8 R, 64.11, 64.16, 64.19, 64.23, 64.24, 64.27, 64.17, 64.21, 217, 218; 280/707, 711, 714; 138/31; 91/47, 51, 52

[56] References Cited

U.S. PATENT DOCUMENTS

| | | | |
|---|---|---|---|
| 1,490,360 | 4/1924 | Bradwn | 91/52 X |
| 1,522,243 | 1/1925 | Hughes | 188/313 X |
| 2,689,616 | 9/1954 | Nagler | 188/313 X |
| 4,177,023 | 12/1979 | Kamiya et al. | 138/31 X |
| 4,386,791 | 6/1983 | Watanabe | 280/707 |
| 4,625,994 | 12/1986 | Tanaka et al. | 280/707 |

FOREIGN PATENT DOCUMENTS

| | | | |
|---|---|---|---|
| 1630058 | 5/1972 | Fed. Rep. of Germany | . |
| 2915012 | 11/1980 | Fed. Rep. of Germany | 188/318 |
| 0576511 | 8/1956 | Italy | 280/711 |
| 0645861 | 2/1979 | U.S.S.R. | 267/64.16 |

Primary Examiner—Andres Kashnikow
Assistant Examiner—Robert J. Oberleitner
Attorney, Agent, or Firm—Edwin E. Greigg

[57] ABSTRACT

A method and an apparatus for controlling the spring stiffness in two bodies or masses that are movable relative to one another and in their absolute positions with variable speeds, in particular in resilient wheel suspension systems for vehicles and the like, wherein the volume positively displaced by a piston in a cylinder pressure chamber can be abruptly switched over into two partial volumes in accordance with load, movement and operating parameters of the vehicle, suspension and wheel as well as vehicle body, with it being possible, with partial volumes communicating with one another, to perform an additional total-volume fine adjustment continuously via a cylinder/piston unit and also in accordance with the parameters mentioned. A suspension concept of this kind, with slow, continuous adaptive adaptation and rapid switchover to greater stiffnesses is augmented by an asymmetrically variable damping and a preferably fast-operating level control means.

27 Claims, 6 Drawing Sheets

METHOD AND APPARATUS FOR CONTROLLING SPRING STIFFNESS, IN PARTICULAR IN VEHICLES

BACKGROUND OF THE INVENTION

The invention is based on a method and an apparatus as generally set forth hereinafter. Means for controlling the spring stiffness, for instance of a motor vehicle, are known (German patent No. 16 30 058); in this known apparatus, two work chambers of a shock absorber or telescoping spring are connected via external lines to an apparatus comprising a pump and two reservoirs. Only one-way check valves are disposed in the connecting lines to the telescoping spring. However, with this type of apparatus, the damper stiffness of this kind of shock absorber cannot be varied, because to do so energy must be supplied from outside—via the pump—which takes a relatively long time and means that there is a certain energy demand. Controlling the damper stiffness in a shock absorber is also known from German Offenglegungsschrift No. 33 04 815. Suspension systems of present-day vehicle types, in particular passenger vehicles, are typically optimized to an average operational case in terms of the spring stiffness and damper stiffness, with parameters being structurally fixed and remaining unchanged, except for effects associated with aging, during driving. Since in extreme operational cases, such as an empty or fully loaded vehicle, or with varying vehicle movement parameters (rapid cornering, braking, acceleration, smooth highway driving, and the like), optimal suspension or damping of the suspension system is not attained in all such operating situations, it is also already known to switch over among a plurality of damper settings or spring stiffnesses. This prevents long-term adaptation of the suspension system (and possibly the damper system, which is either arbitrarily integrated into the suspension system itself or is a component thereof), and especially it is impossible to make an automatic, finely-tuned adjustment to various road conditions or various kinds of driving, because a switchover in the characteristic curves of the suspension and/or damping system can be made only in stages, typically between only two operating states.

It is also known (U.S. Pat. No. 3,807,678), in a suspension system involving two masses, one of which may be one or more wheels of a vehicle and the other the vehicle body, to dispose a standard, passive compression spring between the two masses, which is called a passive isolating element and has a so-called active damper switched parallel to it. This damper, in which a piston slides in a cylinder and divides it into two work chambers, is considered to be active because an intervention is made into the damping properties, that is, into the positive volume displacements of the pressure medium in the various working halves of the damper by control means, in a so-called active manner. To this end, the two working chambers are connected crosswise and parallel to each other via opposed valves allowing a flow of pressure medium in only one direction; the amount of pressure medium then allowed to pass through these valves then also becomes "active" by appropriate control of the valves by means of suitably prepared sensor signals. Because in this known suspension system, the spring itself is entirely passive, but the damper is conceived of as being active in terms of its properties, the overall system in this patent is called a semiactive system. However, this term is not semantically related to the dampers of the present invention, which without reference to suspension systems not taken into account are themselves designated as so-called semiactive dampers, for reasons to be explained hereinafter.

It is also known, in wheel suspensions in vehicles, to provide so-called active damping means (see the article, "Active Damping in Road Vehicle Suspension Systems", published in the periodical, Vehicle System Dynamics, 12 (1983), pages 291–316). This publication is referred to also because it includes basic concepts, in theoretically detailed form, applicable in particular to active damping properties.

OBJECT AND SUMMARY OF THE INVENTION

It is accordingly the object of the invention to disclose an overall concept for a suspension system, optionally with separate or integrated damping means, in which on the one hand an automatic adjustment takes place by adaptation, that is, a learning process, to given movement courses, such as road surface conditions and the like, but which on the other hand is capable of switching over immediately, whenever necessary, to an appropriate other spring stiffness, such as stiffening in the event of unexpectedly fast cornering.

The method and apparatus according to the invention each attain this object as defined hereinafter and have the advantage that despite the particularly simple structure, the invention offers the possibilities of variable stiffness combined with variable damping, as well as rapid leveling, which may be integrated into the system, as needed. Slow, continuous adjustment of the suspension system in terms of its stiffness is also possible, and rapid switchovers, for instance to greater stiffnesses in emergencies, can be made immediately. Overall, only very little externally supplied energy is needed, and merely for control purposes; in other words it need not be used for instance to assure certain restoring spring properties—as a function of operating parameters, for instance—with the exception of a leveling device that may be selectively associated with the overall suspension concept.

The disclosure herein reveals advantageous further embodiments and improvements of the invention. A particularly advantageous feature is a variable asymmetric damper embodiment as a supplement to the suspension concept according to the invention. This damper embodiment operates more or less as if the damper were to incorporate an active damper mode.

BRIEF DESCRIPTION OF THE DRAWING

FIGS. 3–7 show other possible embodiments of variable, semi-active dampers.

FIG. 4 shows another exemplary embodiment of a semi-active damper having direct damping force control by means of plate valves, again accompanied by a diagram FIG. 4a plotting the course of the damping force over the velocity;

FIG. 5 shows a further exemplary embodiment of a semi-active damper having only one working chamber in the cylinder;

FIG. 6 shows an exemplary embodiment of a semi-active damper in which the variably asymmetrical valve mechanisms are housed in the piston; and FIG. 7 shows a variant of the arrangement of the valve mechanisms in the piston, again in section.

DESCRIPTION OF THE PREFERRED EMBODIMENTS

Figure 1:
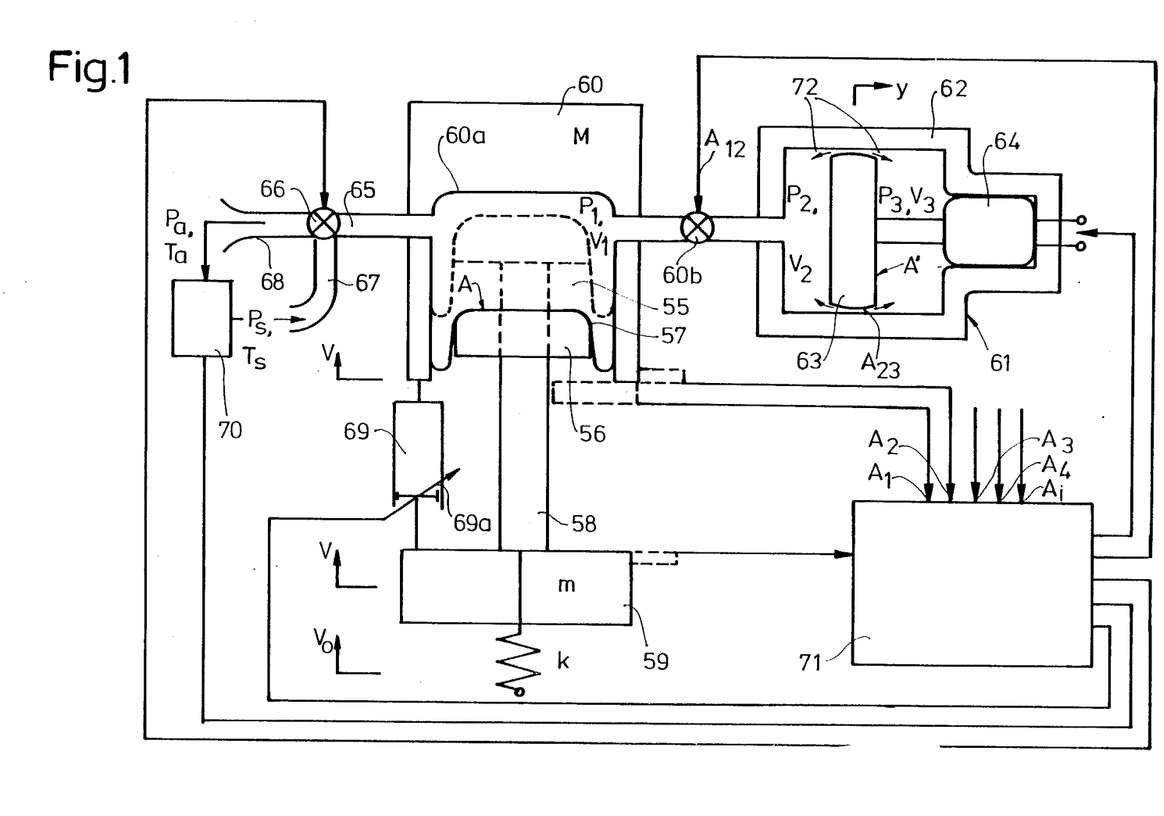
FIG. 1 shows a first embodiment of an overall suspension concept with air suspension, in a so-called semi-active form, selectively with the association of similarly variable or semi-active or activated damping means.

The overall suspension concept illustrated in FIG. 1 includes a resiliently and dampingly suspended two-mass model, in which in terms of a vehicle, k indicates the tire resiliency, m indicates a wheel, elements 55, 56, 57, and 58 represent a spring means between the two masses, M, which indicates the vehicle body and 69 represents a possible damping means connecting the two masses M and m. The symbol $v_O$ indicates the road entry speed, v the wheel speed and V the body speed or velocity, here also called the absolute velocity of the motor vehicle body. The difference between the wheel speed and the body speed represents the relative speed between the two, that is:

$$v - V = V_{rel}.$$

FIG. 1, in a partly schematic manner, shows a so-called semi-active air suspension system; naturally any other suitable gaseous medium may be used instead of air as the pressure medium. A cylinder or pressure medium container 60a disposed on the body mass 60 forms a pressure chamber 55 (pressure $P_a$, volume $V_1$), the volume of which varies relative to the movement of a piston-like element in accordance with the mutual relative speed; to this end, a piston or piston plate 56 is provided, driven by the wheel mass 59 via a piston rod 58. The piston 56 moves to a variable degree into the area of the cylinder via a separating bellows 57 sealing off the pressure chamber 55. The separating bellows 57 rolls off in the area of the wall; dashed lines show it in an inner position. Via a first switchover valve 60b, which determines the springing properties of the suspension system, the pressure chamber 55 communicates with a further mechanism 61, which likewise determines the springing properties of the suspension system and serves to provide an optimizing fine-tuned adjustment of the spring stiffness while the switchover valve 60b is switching over abruptly between different spring stiffnesses.

Figures 3A, 3B, 3C:
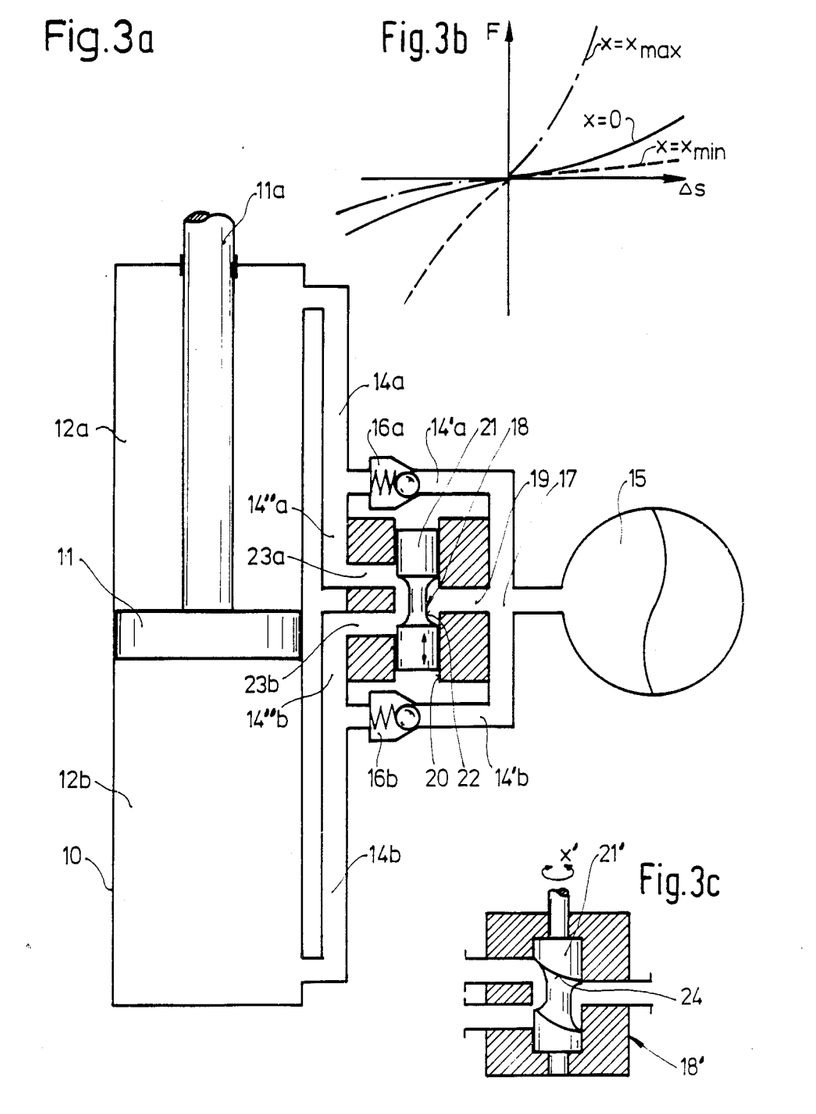
FIG. 3a illustrates a first practical exemplary embodiment of a semi-active damper having variable, asymmetrical damping behavior, in a schematic sectional view, together with a diagram FIG. 3b which plots the course of the damping force exerted over the velocity as well as a further supplementary illustration of an alternative embodiment FIG. 3c of the damping valve.

The mechanism 61 is embodied such that via the switchover valve 60b it makes available a further variable pressure medium volume for the pressure chamber 55, and in detail it is embodied such that an adjusting piston 63 is disposed in a cylinder device 62, the piston 63 in the usual manner undergoing an axial adjustment by means of a controlled drive from outside, that is, via an adjusting member or drive 64 in the cylinder. The adjusting drive 64 is embodied such that whenever it is not electrically triggered, it blocks the piston position; in other words, if a given fine adjustment of the volume of pressure medium optimal for certain load and movement parameters is attained, then this position is maintained without further energy being supplied, until a further change occurs. To this end, the adjusting drive 64 is embodied as self-locking. It is therefore possible to execute the axial adjustment of the piston 63 in the cylinder 62 with restraint, via a worm drive or the like as shown in FIG. 3a.

A leveler 70 communicating on the opposite side with the pressure chamber 55 is provided, which either supplies pressure medium to the pressure chamber 55 via the switchover valve 66 and a branch line 67 or drains pressure fluid from the chamber 55 via the outlet line 68. The structure also includes the arrangement of a damper means 69, which initially may be arbitrarily embodied, but which preferably, as indicated by the arrow 69a, may be a damper means with variable or semiactive, or optionally active, behavior; preferred embodiments of such forms of dampers will be explained in detail below in conjunction with FIGS. 3–7.

The switching over of the valves 60b and 66, the adjustment of the piston 63 and the asymmetrical adjustment which is optionally possible as well of damper characteristic curves of the damper or dampers 69 are then effected as a function of predetermined signals, which can be obtained and processed further in an intrinsically arbitrary way and which are derived substantially from load and movement parameters of the vehicle. Such signals are detected by suitable, appropriately embodied sensors at a suitable location and are delivered to a central control unit 71, which preferably may be a microprocessor, single-purpose computer, process computer or the like. Possible load, operating and movement parameters include for instance the relative speed of the two bodies m and M (wheel 59 and vehicle body 60); absolute velocity of the two bodies, both in the vertical plane; cornering, acceleration and braking; load; speed of the body in the horizontal plane; a signal in accordance with the measured transverse acceleration or transverse tendency (rolling) of the vehicle; a signal in accordance with factors affecting the front and rear axle or relating to vehicle decelerations or accelerations (pitching); a signal in accordance with the load status (level control); a signal in accordance with the road condition; and other arbitrary signals. Obtaining such signals can be accomplished by one skilled in the art by using suitable sensors (not shown), such as acceleration sensors, or sensors for determining relative displacement travel which by means of suitable integration can determine relative displacement speeds as well.

All of these signals which arrive at the inputs A1, A2, A3, A4 . . . Ai, are processed in the central control circuit 71 and produce the various desired kind of action in the present invention; the course of this is substantially as follows. In the semi-active air suspension system shown in FIG. 1, a change in the position of the piston 63 effects a likewise continuous variation of the spring stiffness and thus the opportunity of performing a fine optimization. Thus a slow piston adjustment in the vicinity of the device 61, for instance, can tune the spring stiffness of the suspension system to the condition of the road surface, e.g., a smooth highway, a country road full of potholes, and so forth, as well as to the vehicle velocity; in the final analysis, a predetermined end position of the piston 63 is attained, by which means, a predetermined resilient pressure medium volume is associated with the pressure chamber 55; this volume determines the spring stiffness at that time.

A preferred characteristic of the present invention is that the piston 63 is not sealed off relative to the two volumetric chambers it forms; instead, a certain leakage A23, along the circumference of piston 63 as shown by the arrows 72 is possible, resulting in a static pressure equilibrium, with the further advantage that even when the piston is being adjusted an excessive amount of energy need not be exerted, since the piston 63 does not have to work against the full pressure; instead, an equalizing of pressure can take place at the same time. A further substantial and preferred characteristic of this fine-optimizing mechanism 61 is that the adjusting member is designed to be self-locking; that is, the piston maintains its position even if the input signal is no longer applied by the central control unit 71, and is not displaced again until different absolute velocities in the horizontal plane and/or other road surface properties arise, in which case a change may possibly be necessary in a spring stiffness, which in this case is called a long-term spring stiffness behavior.

On the other hand, the invention also makes it possible, by the provision of a rapid switchover valve 60b, to make an immediate stiffening of the spring stiffness of the overall suspension system, whenever driving conditions or maneuvers that would be better handled with a suspension system of high spring stiffness arise; examples of such conditions are rapid cornering, direct braking maneuvers or other "emergency" situations.

In a similar manner, the present invention succeeds in absorbing rigid body movements such as rolling or pitching vibrations by switching over via the valve 60b in terms of the spring stiffness; however, it is additionally possible to take care of just such movements by using the leveler 70, if one is prepared to provide some extra energy in this area. In that case, the operating speed of the leveler can be increased, so that the leveler is capable of reacting to body movements even in the frequency range of 1.0 Hz, for example; this makes it possible to absorb rolling and pitching movements, and is in contrast to conventional levelers, the reaction time of which is approximately in the range of less than 1.0 Hz. A level control of this kind can then preferably include the rapid switchover valve 66, which for instance responds to an increase in the brake pressure or to acceleration acting on one side and from that side brings about an increased spring stiffness. In this connection, a stabilized course of regulation by the level control 70 can be attained by providing the level control with still further signals, or by triggering the level control via the central control logic 71 such that in addition to changes in the load status, at least one of the other operating and movement parameter signals mentioned above are processed as well. The energy consumption of the level control can then be reduced, if the system is always switched to maximum spring stiffness whenever the level control speed is increased. In this manner, the suspension system can also be simplified overall at another point, so that for instance crosswise rods that damp pitching motion can be dispensed with.

To these above-described possibilities, the exemplary embodiments of semi-active dampers described in summary fashion below can be added, which are shown in FIG. 1 at 69, which is intended to stand for all these dampers. The main concept here is for body movements, as a function of the absolute speed and of the relative body/wheel speed, to be damped without supplying energy (except for a necessary valve control energy), in such a way as to attain a sort of semiactive damper.

Figure 2:
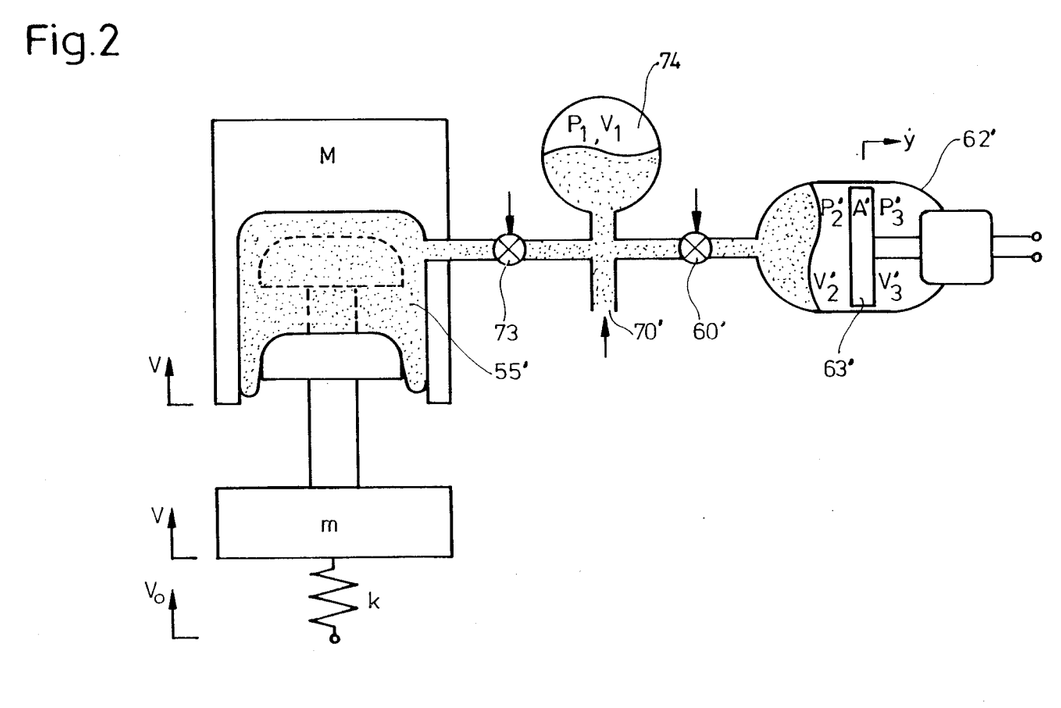
FIG. 2, shows a system similar to FIG. 1, in a hydropneumatic embodiment.

On the other hand, if instead of the air suspension system shown in FIG. 1 a hydropneumatic semiactive system as shown in FIG. 2 is used, then a separate damper can be dispensed with entirely, because in this case it is possible to dispose a damping regulating valve 73, which is additionally provided in this case, directly in the connecting line to the pressure chamber 55'; this valve 73 can then be embodied and controlled in the manner to be explained below in terms of the various damper valves, and their function, as shown in FIGS. 3-7. Because of the shift to a hydropneumatic semiactive system as shown in FIG. 2, it is necessary to provide a pressure equalizing container 74 or accumulator as well, which is partly filled with a gaseous medium (pressure $P_1$, volume $V_1$) that furnishes the required springing properties; then a leveler at 70' engages a branch line disposed following the damper regulating valve 73. Only then is the above-mentioned fast switchover valve 60' switched over, and upon actuation, it immediately provides greater stiffness of the suspension system. The cylinder device 62' is likewise divided into a gas-filled zone, which also contains the piston 63', acting in the same manner as is described earlier herein, and a front partial zone containing the hydraulic medium.

In this hydropneumatic system shown in FIG. 2, the damper regulating valve 73 assumes the damping task which was performed in FIG. 1 by the damper 69. Preferably this damper regulating valve 73 is then embodied in the manner described below in conjunction with FIGS. 3-7, with respect to the asymmetrical damping valve provided in each case in these damper embodiments, and optionally also having further associated check valves disposed in parallel lines, not shown.

In the various damper embodiments described in detail below as advantageous embodiments of the invention, a system is provided which in principle is passive and which can be controlled, by means of an asymmetrical damper valve (preferably in combination with check valves), such that whenever the active damper force has an algebraic sign (+or −) opposite that which can be generated passively, the semi-active form of a damper is always substantially shut off, so that in any event no damping force is developed which is opposite the (active) damping force that is actually desired at this moment for effective damping. Tests have shown that in a practical system, a damper embodiment simplified in this manner has considerable advantages, which can be particularly favorably combined with the overall concept of a suspension system discussed above in conjunction with FIGS. 1 and 2.

In accordance with the above explanation, the damping force control is effected by evaluating preferably the speed data V, that is—in the present application to motor vehicle suspensions—the absolute velocity of the structure, which in terms of measurement technology can be suitably ascertained for instance with acceleration pickups and ensuing integration, and the relative speed $V_{rel}$ between the body and the wheel, which can also be suitably measured, for instance in a known manner by detecting the signals of position detectors on the wheel and on the body, or the displacement travel of the damper movement, or the like. In the ensuing discussion, such provisions for obtaining sensor signals will be assumed to be known per se (see U.S. Pat. No. 3,807,678 referred to hereinabove); likewise, the particular type of movements of the various valve members in the semi-active dampers described below will not be addressed in detail, because such movements can be derived from the detected signals in the usual manner, for instance by means of magnets, electromagnetic effects in general, motor control, and the like. All the ensuing forms of embodiment of semi-active dampers have in common the provision of at least one (uncontrolled) check valve as well as a so-called main valve with a variable asymmetrical damping characteristic; a feature of particular importance is the asymmetrical action of this valve in combination with check valves to realize the various damping force curves described in detail above.

The semi-active shock absorber, a form of damper, shown in FIG. 3a can be disposed between a vehicle axle (not shown) and a vehicle body (not shown) and in principle always comprises a cylinder unit 10 and a piston 11 sliding therein, forming two work chambers 12a and 12b, which are separated by the piston and during damper operation are naturally intended to have variable volumes. The piston is supported by a piston rod 11a, which may be secured to the vehicle body, for instance; the cylinder 10 is then disposed on the vehicle axle. The two work chambers 12a and 12b communicate via respective lines 14a, 14b, which in turn are divided into branch lines 14'a, 14"a and 14'b, 14"b, with a reservoir 15 (namely via the branch lines 14'a and 14"b); this reservoir 15 is by way of example hydropneumatic. Respective check valves 16a, 16b are also located in these branch lines, being embodied as spring-biased ball valves, which block the flow of fluid or pressure medium out of the particular associated work chamber (for instance to the reservoir).

Before the reservoir, the two branch lines 14'a, 14'b rejoin at 17; the two other branch lines 14"a and 14"b act as inlet or outlet pressure lines to a variable asymmetrical damping valve 18, which, via the junction point 17 and a further line 19, again communicates with the reservoir 15 or with the two other branch lines 14'a, 14'b.

In the exemplary embodiment shown in FIG. 3a, the asymmetrical damping valve comprises a valve member 21 supported in an axially slidable manner in a cylindrical bore 20; the valve member 21 is again of substantially cylindrical shape but having a restriction 22 in its middle, which then widens frustoconically, for example, to merge with the adjoining sliding faces. The two valve connections 23a and 23b on the same side communicating with the branch lines 14"a and 14"b are offset in terms of positional height in the valve member adjusting movement; the other valve connection 19 is centrally arranged.

The function of the damper shown in FIG. 3a is accordingly such that in an arbitrary position of the valve 21 in one direction, for instance if the shock absorber is compressed when a bump is encountered, pressure medium can flow via the branch line 14"b and via the valve, with a predetermined valve resistance and hence a corresponding damping resistance, into the line 19 and from there via the check valve 16a to the other work chamber, which is intended to represent a damping force that is assumed to be positive. If immediately thereafter $\Delta \dot{s} < 0$ an even minimal negative damping force should then be required, then the check valve 16b in this case enables the rapid spreading apart of the piston/cylinder unit, since in this case the pressure medium can flow out of the upper work chamber 12a (as seen in the drawing) via the damper valve 18, which because of its asymmetry in this case and in the position it maintains is virtually resistance-free, and via the check valve 16b into the other work chamber. Because of the displaceability of the valve member 21, the variable asymmetrical damping becomes possible. A semi-active damper of this kind is therefore capable of generating the (nonlinear) damping force curves plotted over the speed in the diagram FIG. 3b, which includes curves having the same shape but drawn in solid and broken lines. If the valve member is for instance located symmetrically in the middle of the connection position (x=0), then identical damping forces result for both speed directions; at the various stop positions of the valve member (x=$x_{max}$; x=$x_{min}$), highly non-symmetrical or nonlinear damping forces for the two different speed directions are obtained.

It will be understood that the variably asymmetrical damper valve 18 can be varied in many ways; for instance, the valve member 21', like the damper valve 18', can be embodied as shown in FIG. 3c. Then the adjusting movement is a rotation x', and the two transitional faces extending obliquely in the same direction on both sides show that the valve assures asymmetrical behavior, which in principle means that the two valve connections 23a, 23b undergo a different flow resistance from the connection 19 on the other side, at a given valve member position; that is, generally stated, the valve has different opening cross sections for the two connections 23a, 23b in each position (except for the middle position).

In the explanation of the embodiments below, it will first be noted that the only characteristics to be described will be those that differ from the basic concept described in conjunction with FIG. 3a; it is applicable in principle to all the embodiments in that the damper valves are designed such that they have a built-in asymmetry with respect to the relative speed. If the damper valve then receives an order, for instance a tensile force (tension and pressure, or compression, are used here in terms of the possible factors acting on the damper from outside), then the valve automatically generates only a very slight pressure force, even if the relative speed is in the same direction as the pressure. If such behavior is built into the valve, then the demands on the valve in terms of its frequency response behavior are less, and the regulator or the electrical control circuit can also be simplified.

Figures 4, 4A:
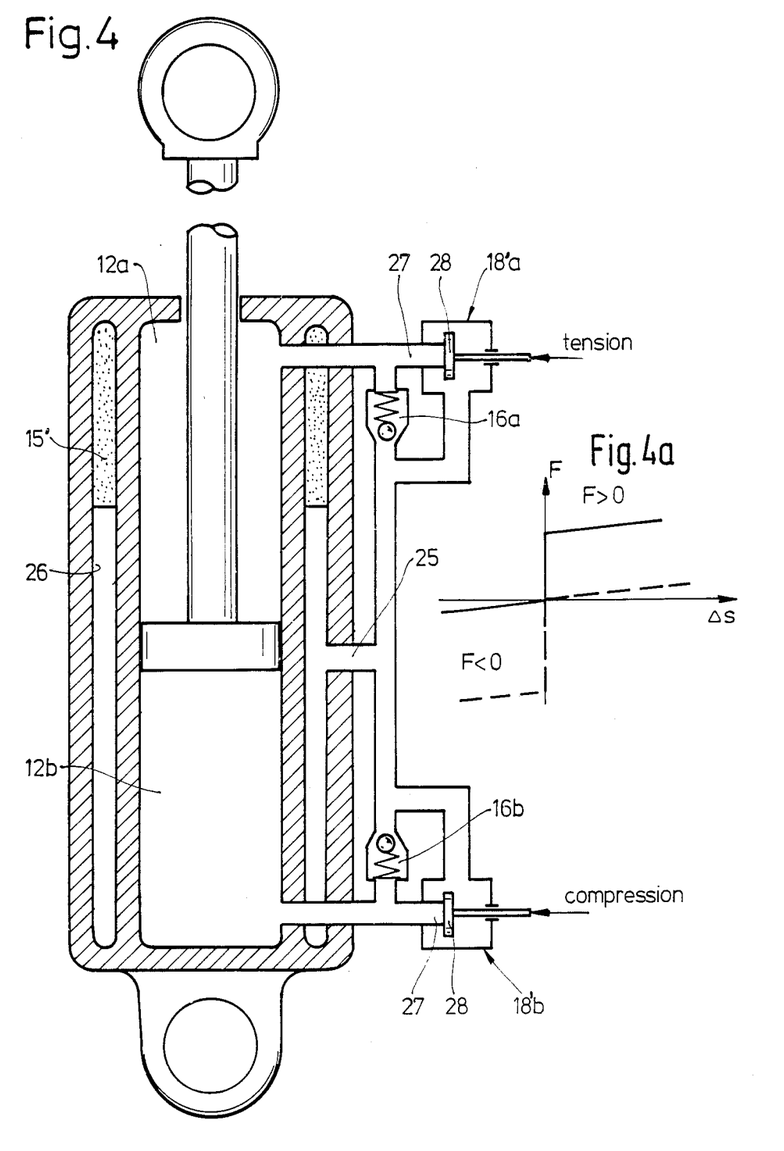

With the exception of the exemplary embodiment of FIG. 4, in which the valve force is more or less directly controlled, the valve resistance in the other exemplary embodiments is determined by the valve position. In the simplest case, the dampers or control valves can be switched over simply as a consequence of the signal supplied, which signal may for instance be the result of measurement of the absolute body speed. Continuous variations of the valve resistance or of the damper force generated are possible by means of force feedback circuits. An essential feature of the exemplary embodiments described herein is that in combination with the basic valve mechanism, that is, the damper valve, various check valves are provided, so that in general the valve region can be made to operate as best as possible. It should be noted in this connection that a certain, albeit passive, damping contribution (e.g., a force component proportional to or as a function of the relative speed) is always necessary, because of the slight damping properties of the unsprung mass on the "tire spring" [i.e. the tires acting as spring means by their resilience]. Therefore, it is unnecessary for the damper valves to function absolutely "perfectly"; in actuality, the damper valves should be mechanically limited by stops, so that the damping principle cannot be varied overly extensively, which otherwise could possibly bring about a dangerous situation in the event of a failure of the control device or if there are malfunctions in the valve itself.

In the exemplary embodiment shown in FIG. 4, the two work chambers, which here again are indicated at 12a and 12b, again communicate directly with one another via the two check valves 16a and 16b and with a hydropneumatic compensating reservoir via a cylindrical chamber 26; this compensating reservoir is shifted into an annular recess 26 of the cylinder and is shown at 15'. Parallel to the respective check valves 16a, 16b, as in the exemplary embodiment of FIG. 3a, is the damper valve, here divided into zones 18'a, 18'b, each acting as a plate valve, accordingly the valve inlet or outlet 27 can be acted upon directly for instance by electromagnetically controlled forces, which move the valve plate 28 into contact (closure of the valve part) or into a raised position (opening of the valve part). In FIG. 4, the upper valve part 18'a shown is arranged for tension forces acting upon the damper and its damping, and the lower valve part is arranged for compression, or pressure forces acting upon the damper. Here, the electromagnetically generated compression or tension control forces are reinforced hydraulically.

Figures 5, 7:
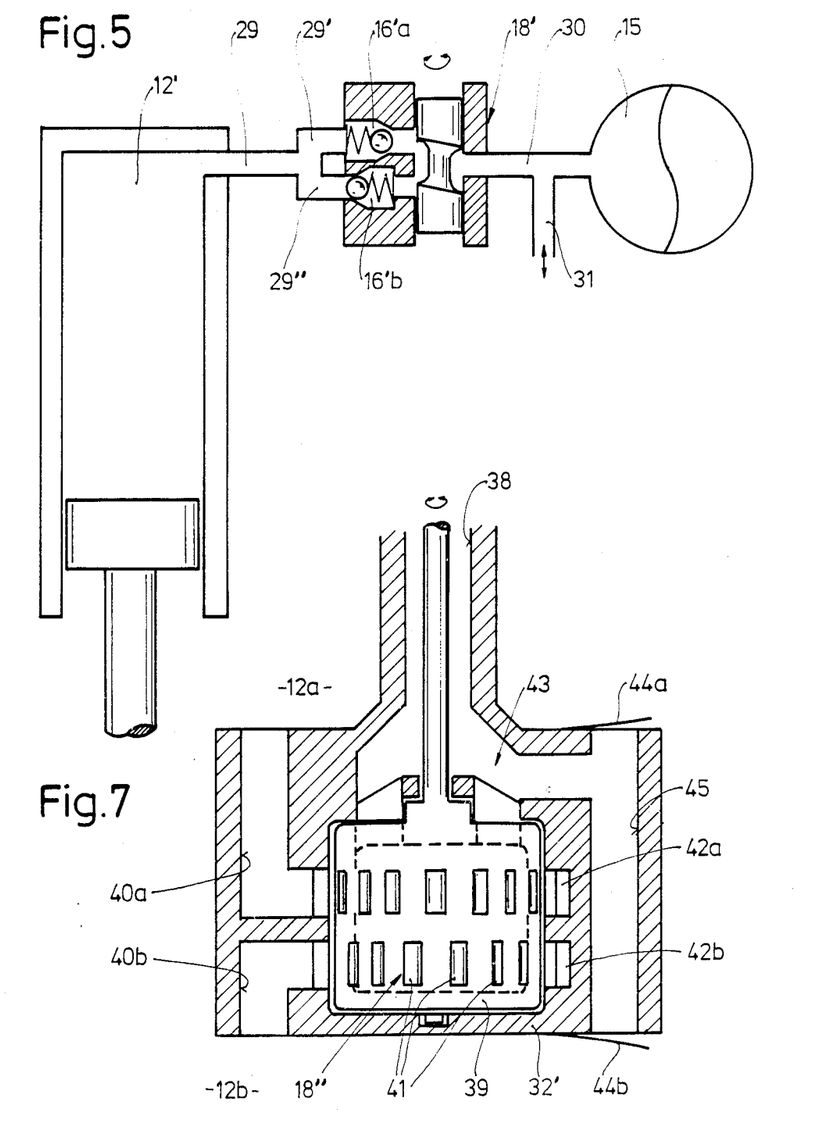

The exemplary embodiment of FIG. 5 represents a pressure medium control option that is connected to only one work chamber 12'; a pressure line 29 leading away from the work chamber 12' divides into two partial lines 29' and 29'', each having a check valve 16'a, 16'b connected in series with a damper valve 18', which has the same reference numeral and is embodied the same as the alternative valve embodiment of FIG. 3a, with the same action. The sole valve connection line 30 continues on communicates with the hydropneumatic reservoir or compensating container 15; a branch line 31 may be connected to a load leveler, not shown.

Figure 6:
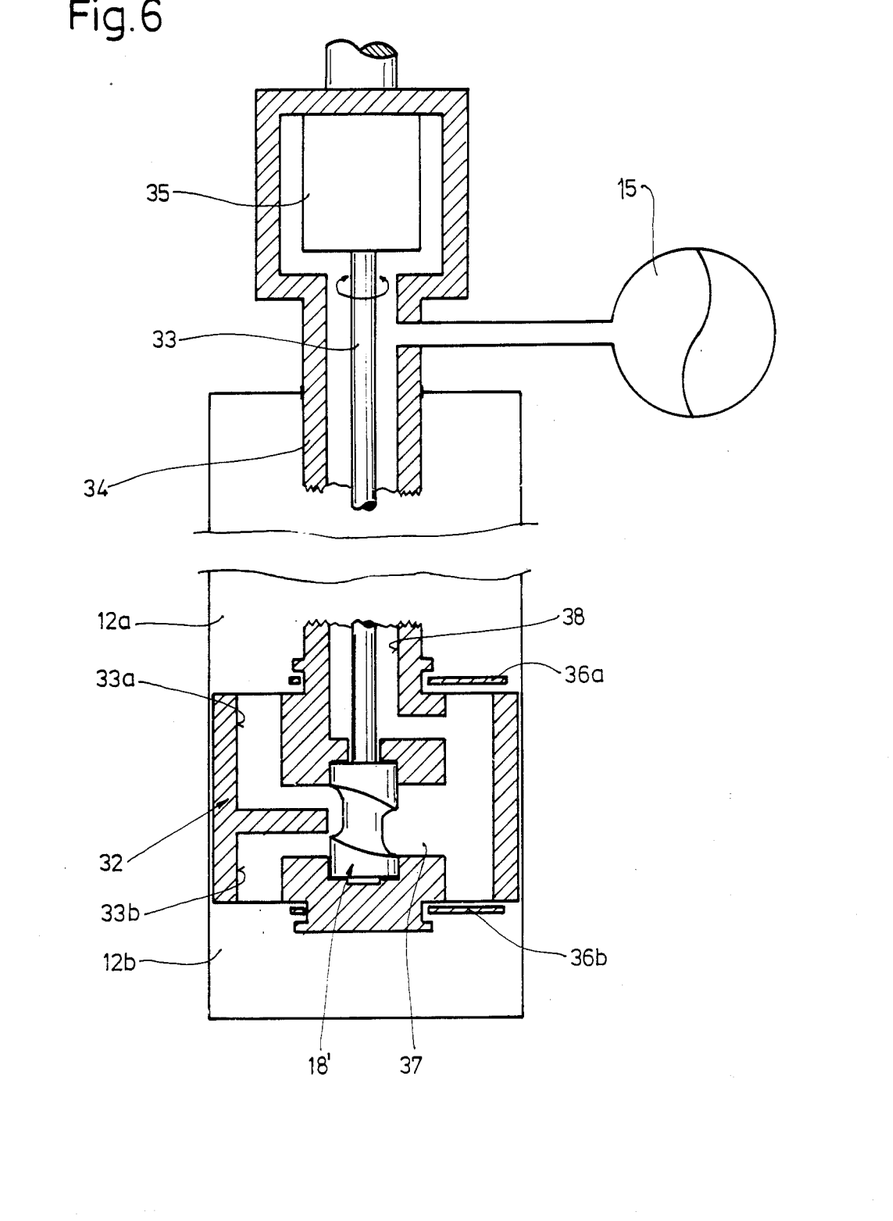

The following exemplary embodiments of FIGS. 6 and 7 differ from those described above in that the entire valve mechanism (check valves and variably asymmetrical damper valve) is disposed in the piston of the damper. The piston is marked 32 in FIG. 6; it includes openings 33a, 33b at both sides, opening into the work chambers 12a, 12b and leading to a damper valve 18', which corresponds in its fundamental structure and its function to the damper valve 18' already described in conjunction with FIG. 3a and having a rotating member, to which end a control rod 33 is provided, which penetrates the piston and the piston rod 34 and extends to a drive member 35.

The check valves still required here are shown as simple flap-type valves 36a, 36b; they effect communication of the single damper valve connection 37 with the two work chambers 12a, 12b and at the same time via a line 38, initially extending in the interior of the piston rod, with the externally located hydropneumatic reservoir 15. The basic mode of operation of this exemplary embodiment corresponds to that described above; for each flow direction of pressure medium, one check valve and one of the openings of the variably asymmetrical damper valves 18' must be passed through, so that once again the damper forces represented by the various curves in the diagram are obtained.

The valve mechanism shown in FIG. 7 also corresponds in its basic structure and function to the valve mechanism of FIG. 6, with the exception that here, although the damper valve 18'' does include a rotating valve member 39, nevertheless it is designed for low pressure and simultaneously large throughput. The lines joining the respective work chambers 12a, 12b to the damper valve are shown at 40a, 40b; they discharge into respective annular recesses in the structure of the piston 32'. The annular recesses are embodied such that they have windows that, depending on the angular position of the rotating valve member 39, which is for example cup-shaped or sleeve-like, are either aligned with window-like flowthrough openings 41 extending over the circumference of the rotating valve (in which case the valve is opened) or are offset with respect to these flowthrough openings (so that the valve is blocked, at least for this connection zone). To realize the asymmetrical valve behavior, the flowthrough window rows in the rotating valve member 39 that are aligned toward the various annular recesses 42a, 42b in the piston are now offset with respect to one another, which can be clearly seen in the drawing if the upper windows are compared with the lower ones. This means that in the two extreme end positions, either only the upper windows, or only the lower windows, or any conceivable combination, can then be aligned for flow of the pressure medium to the corresponding windows in the annular recess, so that the variably asymmetrical behavior is assured. The check valves may be simply resilient flaps 44a, 44b on both sides of the piston, which are capable of opening or closing a common lateral conduit 45 in the piston, depending on the piston movement. This conduit 45 communicates with the one (shared) connection 43 of the damper valve 18''; via a central through opening 38 in the piston rod, the communication is then provided with the hydropneumatic reservoir 15, which is not shown in this exemplary embodiment.

All the characteristics described in the above description, recited in the ensuing claims and shown in the drawings may be essential to the invention either individually or in any arbitrary combination with one another.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A semi-active system for controlling the transmission of energy between spaced members comprising a spring means between said members, said spring means includes at least one cylinder, one piston connected with said at least one cylinder and a fluid pressure chamber therefor, a first rapid switchover valve arranged to be influenced by pressure of said spaced members on said at least one cylinder, a second cylinder unit connected by a fluid pressure connection via said rapid switchover valve to said pressure chamber of said spring means, said second cylinder unit including a motor driven adjustment member for varying fluid pressure in said pressure chamber, whereby said rapid switchover valve controls a fluid pressure medium under pressure to said pressure chamber and thereby stiffness of said spring means in said system in relation to prevailing load and movement parameters.

2. An apparatus as defined by claim 1, in which said second cylinder unit includes a second piston which divides said second cylinder into two chambers and is adapted for a predetermined leakage between said two chambers to thereby attain a static pressure equilibrium.

3. An apparatus as defined by claim 2, in which said second piston is arranged for axial adjustment by an adjustment member relative to said second cylinder.

4. An apparatus as defined by claim 3, in which said pressure chamber of said at least one cylinder is connected to a leveler.

5. An apparatus as defined by claim 3, in which said pressure medium is a gaseous medium such as air.

6. An apparatus as defined by claim 2, in which said pressure chamber of said at least one cylinder is connected to a leveler.

7. An apparatus as defined by claim 1, in which said pressure chamber of said at least one cylinder is connected to a leveler.

8. An apparatus as defined by claim 7, in which the leveler communicates via a second fast switchover valve with said pressure chamber.

9. An apparatus as defined by claim 8, in which said leveler becomes operational at least intermittently as a fast pressure regulating device for intercepting predetermined rolling and pitching movement of the vehicle in response to said prevailing load and movement parameters.

10. An apparatus as defined by claim 7, in which said leveler becomes operational at least intermittently as a fast pressure regulating device for intercepting predetermined rolling and pitching movement of the vehicle in response to said prevailing load and movement parameters.

11. An apparatus as defined by claim 7, in which said system further includes a central control microprocessor unit to which input signals relating to various load, operating and movement parameters are supplied, said microprocessor unit being further arranged to trigger said switchover valve, said adjusting member of said second cylinder unit and said leveler.

12. An apparatus as defined by claim 7, further including a damper that includes a piston displaceable in a cylinder which divides said at least one cylinder into two work chambers and a valve for controlling the flow of pressure medium from one work chamber into the other, said valve being embodied such that in at least one movement direction a respective check valve is connected in series with an opening of a damper valve, a position of which is controlled by control means and further the damper valve being arranged such that for damping forces (Fd) exerted and acting in different directions, different flow resistances for the pressure medium are produced resulting in asymmetrical damping properties for a respective predetermined position of a valve adjusting member, the valve adjusting member being adapted to move out of a first maximum opening position for compression and a second maximum opening position for tension, respectively, into other arbitrary intermediate positions therefor and further that externally supplied energy may be dispensed with and a semi-active damper system attained, whereby the damping force is substantially reduced to zero (Fd=0) whenever damping forces having an algebraic sign (+ or −) opposite to that of the damping force desired occurs as a result of the movement courses.

13. An apparatus as defined by claim 12, further wherein both work chambers communicate with one another and simultaneously with a hydropneumatic reservoir via check valves blocking the outflow of the pressure medium from the associated work chamber, that the opening of said damper valve, a position of which is controlled by control means is connected parallel to each check valve for a predetermined flow direction, the valve member being arranged such that upon a controlled valve member movement, the prevailing flow directions are controlled differently, that is, with asymmetric damping behavior, and in an opposite direction with respect to an opening cross section.

14. An apparatus as defined by claim 13, further wherein said damper valve is a valve having three connections and a cylindrical valve member that is axially displaceable by triggering and has a central recess, such that the axial displacement of the valve member closes one flow direction to the extent that the other flow direction is opened.

15. An apparatus as defined by claim 13, further wherein the damper valve includes a rotating valve member which includes a central recess with obliquely extending limiting walls, and upon rotation of the damper valve by means of a corresponding signal triggering means, one flow direction is closed to the same extent that another flow direction is opened.

16. An apparatus as defined by claim 13, further wherein a separate valve part of said damper valve is connected in parallel with each check valve, each said separate valve part having plate valve members which are electromagnetically movable, by swithover means into an opening position and a closing position, one said separate valve part being responsible for a tension stage and the other said separate valve part being responsible for a compression stage.

17. An apparatus as defined by claim 12, further wherein the hydropneumatic reservoir communicates with the two work chambers selectively via at least one of the check valves and the variably asymmetrical damper valve and said reservoir is disposed in an annular chamber in the cylinder.

18. An apparatus as defined by claim 7, further wherein said at least one work chamber communicates via a connecting line diverging into two branch lines with respective antiparallel check valves, one of which branch lines communicates with a damper valve, the other of which branch lines is connected to a hydropneumatic reservoir.

19. An apparatus as defined by claim 18, further wherein the valve member of the damper valve is a rotating valve member.

20. An apparatus as defined by claim 19, further wherein an assembly comprising the check valves and a variably asymmetrical damper valve is disposed in the piston.

21. An apparatus as defined by claim 20, further wherein the piston is disposed in a central bore communicating with upper and lower work chambers and is arranged to receive said variably asymmetrical damper valve having said rotating valve member, the rotating valve member being actuatable through a hollow piston rod by a control rod, the other damper valve connection communicating via flap-type check valves with the upper and lower work chambers, and the hollow piston rod simultaneously connects the one damper valve connection with an external hydropneumatic reservoir.

22. An apparatus as a defined by claim 21, further wherein in the valve member in the piston is cup-shaped and is rotatable to present arbitrarily asymmetrical flow resistance and provided with means defining openings comprising individual flow windows disposed in at least two rows, which windows are aligned with respectively associated means defining flow opeings for the pressure medium communicating with the upper and lower work chambers, the means defining the openings in the two rows being offset relative to one another by one increment of width, for the purpose of asymmetrically varying the flwo therethrough, whereby low pressure conditions and high flow conditions are attained.

23. An apparatus as defined by claim 1, which includes a second fast switchover valve arranged to control a pressure medium in said pressure chamber by a leveler means.

24. An apparatus as defined by claim 1, in which said pressure medium in said system is a hydropneumatic medium, and said apparatus further includes an additional equalizing container and a damper regulating valve connected in a connecting line extending to said pressure chamber.

25. An apparatus as defined by claim 15, in which said damper regulating valve exhibits asymmetrical flow behavior and includes additional check valves to attain a semi-active damping behavior.

26. An apparatus as defined by claim 1, in which said system further includes a damper having an assymetrically semi-active damping behavior which is additionally incorporated between said spaced members which comprise at least a wheel and a vehicle body.

27. A method for controlling a spring stiffness between two bodies or masses moving relative to one another and with variable speeds in terms of their absolute positions, which includes displacing a piston in a cylinder and thereby effecting a change of a fluid volume in a cylinder chamber, abruptly switching avaiable fluid volume from between at least two volumes as a function of movement and load parameters of said two bodies, combining the two volumes at a switching position into a total volume, continuously performing an additional total-volume fine adjustment taking into account prevailing load and movement parameters whereby the spring stiffness is optimized for relatively long periods of time.

* * * * *